United States Patent
Kendall

(10) Patent No.: US 7,343,725 B2
(45) Date of Patent: Mar. 18, 2008

(54) CUTTING ATTACHMENT FOR VEHICLE

(75) Inventor: Donald H. Kendall, Chassell, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/482,299

(22) Filed: Jun. 26, 2006

(65) Prior Publication Data

US 2007/0294992 A1 Dec. 27, 2007

(51) Int. Cl.
*A01D 34/00* (2006.01)
(52) U.S. Cl. .................... 56/12.7; 56/15.9
(58) Field of Classification Search .............. 37/302; 144/34.6; 56/229, 10.4, 12.7, 14.7, 15.9, 56/17.1, 233
See application file for complete search history.

(56) References Cited

U.S. PATENT DOCUMENTS

| | | | |
|---|---|---|---|
| 1,614,856 A | 1/1927 | Overbeck, Jr. | |
| 2,200,230 A | 5/1940 | Hojnowski | |
| 2,694,282 A | 11/1954 | Kirby | |
| 2,793,487 A | 5/1957 | Wobermin | |
| 2,821,217 A | 1/1958 | Shald | 144/34.1 |
| 3,033,253 A | 5/1962 | Purdy | 144/34.1 |
| 3,557,850 A | 1/1971 | Owens et al. | 144/34.6 |
| 3,704,031 A | 11/1972 | Confer | |
| 3,724,579 A | 4/1973 | Albertson | |
| 3,743,316 A | 7/1973 | Stotesbery | |
| 3,770,293 A | 11/1973 | Anderson | |
| 3,841,656 A | 10/1974 | Kramb et al. | |
| 4,162,606 A | 7/1979 | Weichel | |
| 4,253,296 A | 3/1981 | Boydston | |
| 4,658,519 A | 4/1987 | Quenzi | |
| 4,790,085 A | 12/1988 | Rossman | |
| 4,826,103 A | 5/1989 | McKown | |
| 4,946,488 A | 8/1990 | Davison | |
| 5,097,911 A | 3/1992 | Kendall | |
| 5,308,114 A | 5/1994 | Williams et al. | |
| 5,531,478 A | 7/1996 | Houston et al. | |
| 5,586,785 A | 12/1996 | Warner et al. | |

(Continued)

OTHER PUBLICATIONS

U.S. Appl. No. 10/885,389, filed Jul. 7, 2004, Chopra, Kewal, Hedge Breaching Device.

*Primary Examiner*—Thomas B. Will
*Assistant Examiner*—Mai T Nguyen
(74) *Attorney, Agent, or Firm*—David L. Kuhn; Thomas W. Saur; Luis Miguel Acosta

(57) ABSTRACT

A debris cutting system for attachment to a vehicle. The system includes a nose shaped projection that extends horizontally in the forward direction from the forward moving end of the vehicle. The projection includes a front blade mount subsystem, a pair of rear blade mount subsystems, and left and right blades that are mounted within the front blade mount subsystem and respective ones of the rear blade mount subsystems. Each blade has a respective blade front, blade rear and teeth. The front blade mount subsystem provides vertical movement at the front of the blades, the rear blade mount subsystems provide vertical and longitudinal movement at the rear of the blades such that cutting of debris is enhanced and potential damage to the blades is reduced as the vehicle moves forward.

6 Claims, 10 Drawing Sheets

U.S. PATENT DOCUMENTS

| | | |
|---|---|---|
| 5,600,943 A | 2/1997 | Ryan |
| 5,970,634 A | 10/1999 | Dann et al. |
| 6,105,680 A | 8/2000 | High |
| 6,314,707 B1 | 11/2001 | Ryan |
| 6,439,279 B1 * | 8/2002 | Underwood ............... 144/34.6 |
| 6,701,646 B2 | 3/2004 | Schultz et al. |
| 6,860,040 B2 | 3/2005 | Schultz et al. |

* cited by examiner

CUTTING ATTACHMENT FOR VEHICLE

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to a system for a cutting attachment for a vehicle.

2. Background Art

For many vehicles, vegetation, plant undergrowth, vines, as well as ropes, wires, and similar debris or like obstructions present a problem for mobility of the vehicle. Cutters are typically attached to the vehicle to attempt to provide an open path for the vehicle. However, removal or clearing the debris to provide a passable path for the vehicle can take a substantial amount of time and energy when conventional approaches to cutting attachments are used.

In particular, conventional cutter attachments on vehicles often fail to accommodate topographical and obstacle variations (e.g., slopes, hills, rocks, etc.) over which the vehicle passes. In particular, conventional simple slider or shoe devices are implemented on the lateral ends of the conventional cutter device to ride on the terrain to attempt to maintain ground clearance for the cutting mechanism. However, obstructions such as rocks, stumps, and the like may be encountered between the slider devices, and the cutting attachment is often impacted against the obstruction and damaged or broken. Further, conventional cutter attachments often fail to provide for quick and simple replacement of dull or damaged cutting surfaces.

Thus, there exists a need and an opportunity for an improved cutting attachment (e.g., a system for cutting debris) for a vehicle. Such an improved debris cutting system for attachment to a vehicle may overcome one or more of the deficiencies of the conventional approaches.

SUMMARY OF THE INVENTION

Accordingly, the present invention may provide an improved cutting attachment (e.g., a system for cutting debris) for a vehicle. The improved cutting attachment system of the present invention may be implemented as a system for cutting debris that is mounted to the respective vehicle.

According to the present invention, a debris cutting system for attachment to a vehicle is provided. The system comprises a nose shaped projection that extends horizontally in the forward direction from the forward moving end of the vehicle. The projection comprises a front blade mount subsystem and a pair of rear blade mount subsystems. Left and right blades that are mounted within the front blade mount subsystem and respective ones of the rear blade mount subsystems. Each blade has a respective blade front, blade rear and teeth. The front blade mount subsystem provides vertical movement at the front of the blades, the rear blade mount subsystems provide vertical and longitudinal movement at the rear of the blades such that cutting of debris is enhanced and damage to the blades is reduced as the vehicle moves forward.

The front blade mount subsystem comprises an upper front slide, a lower front slide, a left front blade support, and a right front blade support. The left front blade support and the right front blade support are mounted between the upper and lower front slides. The left front blade support supports and holds the left blade front, and the right front blade support supports and holds the right blade front. The left and right front blade supports are cylindrically shaped to provide rotation about a lateral axis and the rotation is limited by the respective blades such that the vertical movement at the front of the blades is provided.

The front blade mount subsystem further comprises upper left and right front springs, lower left and right front springs, and left and right front slide bolts. The upper front slide comprises an upper left slide bolt hole and an upper right slide bolt hole. The lower front slide comprises a lower left slide bolt hole and a lower right slide bolt hole. The respective front slide bolts are received in respective recesses in an upper portion of the nose shaped projection, extend centrally through the respective upper front springs, through the respective upper slide bolt holes, through the respective lower slide bolt holes, centrally through the respective lower front springs, and are threadably fastened in a lower portion of the nose shaped projection such that the respective upper and lower front springs provide compressive force to retain the respective blade fronts.

Each of the cylindrically shaped front blade supports comprises an upper portion and a matching lower portion. The upper portion comprises a substantially semi-cylindrical upper shaft region, a stud portion that extends radially at one end of the upper portion, and a substantially semi-cylindrical upper flange end at the end of the shaft region opposite the stud portion. The lower portion comprises a substantially semi-cylindrical lower shaft region, a radial hole that mates with the stud portion, and a substantially semi-cylindrical lower flange end at the end of the lower shaft region opposite the radial hole. The stud protrudes through a respective front blade mounting hole and into the radial hole to removably clamp the blade front in the front blade support between the respective upper portion and lower portion.

The upper and lower front slides comprise respective substantially semi-cylindrical upper and lower shaft recesses that receive the respective upper and lower shaft regions, and respective substantially semi-cylindrical upper and lower flange recesses that receive the respective upper and lower flange ends. The respective cylindrically shaped upper and lower front blade supports rotate in the upper and lower recesses, and the respective upper and lower flange ends laterally restrain the front blade supports in the front slides.

The rear blade mount subsystem comprises left and right sections. The left and right sections each comprise a blade clamp apparatus that comprises an upper rear blade clamp, a lower tensioner, an upper tensioner, a rear slide, vertical rear tension springs, and longitudinal rear tension springs. The upper rear blade clamp is threadably mechanically coupled to a lower rear blade clamp via bolts. The respective blade rear is clamped between the upper rear blade clamp and the lower rear blade clamp. The lower tensioner that is slidably mechanically coupled to the upper tensioner via a shaft extension on the upper tensioner that snugly fits into a mating cylindrical through bore in the lower tensioner.

The upper tensioner and the lower tensioner are T shaped with substantially similarly sized cylindrical vertical legs and cross-bars, and the lower tensioner is an inverted T shape. The upper tensioner and the lower tensioner are laterally and vertically restrained, and slide in the fore/aft direction in respective mating grooves in the projection via tension exerted by the vertical rear tension springs and longitudinal rear tension springs to provide vertical and longitudinal movement at the rear of the blades. The vertical rear tension springs are sized to snugly slide over respective vertical leg members of the upper tensioner and the lower tensioner.

The longitudinal rear tension springs are mechanically fastened at a front end to the front end of the respective groove and at a rear end to the front end of a respective cross-bar portion of the T shape of the upper tensioner and the lower tensioner. The rear slide comprises a substantially cylindrical body section that has a center through bore sized to receive the vertical leg of the lower tensioner and freely slide vertically thereon. The rear slide further comprises a connector leg and an axle. The cylindrical body section is implemented as a vertically oriented pipe. The connector leg is generally horizontally and longitudinally oriented and mechanically couples the body section to the axle. The axle is horizontally and laterally oriented.

The respective upper rear blade clamp and the lower rear blade clamp are fastened together to form a substantially cylindrical, laterally oriented receiving bore, the bore is sized to receive the axle to provide vertical and longitudinal movement at the rear of the blades, and a gap in the upper rear blade clamp and the lower rear blade clamp provides a clearance path for the connector leg.

The upper rear blade clamp includes a plurality of pegs that extend downward from the underside of the upper rear blade clamp, the lower rear blade clamp includes a matching plurality of vertical holes that are sized and positioned to mate with the respective pegs. When the upper rear blade clamp and the lower rear blade clamp are fastened together, the pegs extend through respective rear mounting holes in the rear blade to removably fasten the blade rear within the system.

The system further comprises a substantially triangular shaped or "arrowhead" shaped tip at the apex of the projection that intersects, spreads and positions debris to be displaced or cut via the system as the vehicle moves forward.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
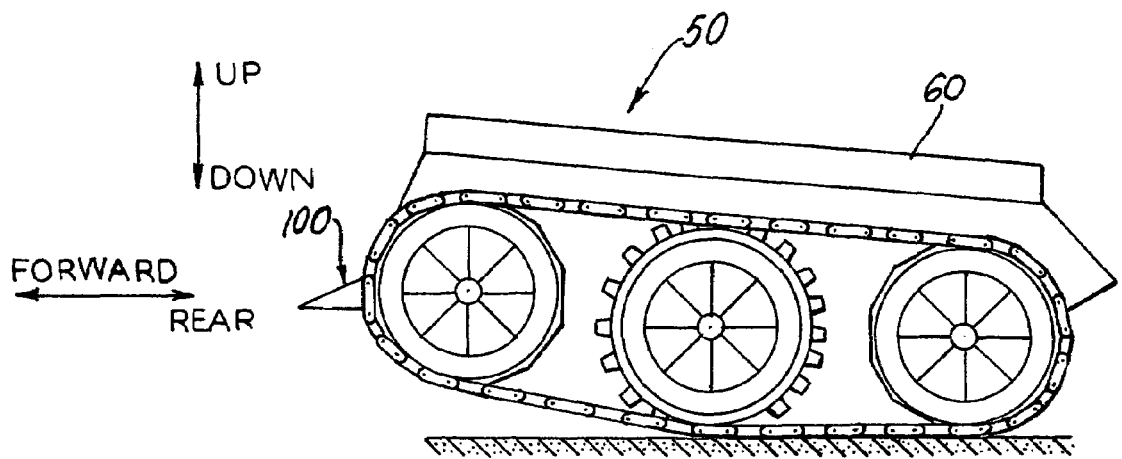
FIG. 1 is a diagram of a vehicle implementing an example of the present invention.

With reference to the Figures, the preferred embodiments of the present invention will now be described in detail. Generally, the present invention provides a system for an improved cutting attachment (e.g., a system for cutting debris) for a vehicle. The improved cutting attachment system of the present invention may be implemented as a system for cutting debris (e.g., a "brush blade", and the like) that is mounted (i.e., fastened, fixed, installed, implemented in connection with, etc.) to the respective vehicle. The present invention generally provides a system that promotes clearing a path for passage of the respective vehicle, protection of the vehicle to reduce damage to the vehicle, clearing a fireline, reducing interference with mine clearing equipment, and protection for an operator of the vehicle from injury. The debris that is generally cut and cleared by the cutting attachment of the present invention may include brush, shrubs, small trees and limbs, roots, vines, rope, sea weed, fence material, wire, cable, and the like.

In one example, the cutting attachment (or cutter) of the present invention may be implemented as stand-alone device that is mounted to a respective vehicle. In another example, the cutting attachment of the present invention may be implemented in connection with a vehicle mounted mine clearing system (not shown, e.g., rollers, flails, cutting disks, and the like). The present invention may be advantageously implemented for use in connection with vehicles that operate on road or off road, through swamps and bogs, and through water.

The present invention generally includes a pair of cutting blades (e.g., a blade sub-assembly) that are semi-movably (and, thus, semi-rigidly) attached relative to vertical movement of the vehicle, and to forward/rearward (longitudinal) movement of the vehicle. The partially flexible mounting of the blade sub-assembly generally includes slides, springs, and studs (or bolts), as described in detail below. The partially flexible mounting of the blade sub-assembly may reduce or prevent buckling and excessive flexing of the blades as more dense material is cut and thus reduce or prevent blade breakage.

The vertically partially flexible mounting of the blade sub-assembly may further accommodate uneven terrain over which it may be desirable to operate the vehicle. Such uneven terrain may cause undesirable blade bending, buckling and breakage in conventional approaches. The partially flexible mounting of the blade sub-assembly may provide a substantially parallel orientation of the cutting blades relative to the surface over which the vehicle is operated.

The longitudinally partially movable mounting of the blade sub-assembly may further provide an enhanced displacement of debris before, during, and after the cutting process that is performed via the present invention. As the cutting blades are generally orientated diagonally with respect to the forward motion of the vehicle, the longitudinally partially flexible and movable mounting of the blade sub-assembly of the present invention may yet further provide an enhanced sawing motion to the cutting blades.

Referring to FIG. 1, a diagram illustrating a vehicle 50 having a cutting attachment system (e.g., apparatus, device, etc.) 100 of the present invention is shown as typically implemented (i.e., installed, mounted, fixed, attached, hooked, fastened, mechanically coupled, integrated within, combined with, made part of, incorporated in connection with, etc.). In one example, the vehicle 50 may be implemented as a manned or unmanned mine clearing device. In another example, the vehicle 50 may be implemented as an unmanned multi-purpose vehicle (e.g., a robotic vehicle). In yet another example, the vehicle 50 may be implemented as a manned or unmanned underwater exploration craft. However, the vehicle 50 may be implemented as any appropriate vehicle to meet the design criteria of a particular application.

Forward/reverse (longitudinal) and vertical (up/down) directions relative to the vehicle 50 and system 100 are generally as illustrated. As such, lateral (left/right) directions (see, for example, FIG. 2A) are generally perpendicular to the longitudinal/vertical plane.

In one example (e.g., as illustrated in FIG. 1), the vehicle 50 may be implemented as a tracked (i.e., track steered and track driven) vehicle. In another example (not shown), the vehicle 50 may be implemented as a wheeled vehicle. In yet another example (not shown), the vehicle 50 may be implemented as a so-called half-track (i.e., steered via wheels and driven via a track system) vehicle. In yet a further example (not shown), the vehicle 50 may be implemented as a ski steered and track system driven vehicle (e.g., a snow mobile). However, the vehicle 50 may be implemented having any appropriate vehicle steering apparatus and driving apparatus to meet the design criteria of a particular application.

The vehicle 50 generally comprises a hull structure 60 to which the cutter assembly 100 is generally attached or made part of. The cutting apparatus 100 is generally implemented on the front of the hull 60 (i.e., on the end of the hull 60 that is at the forward moving end when the vehicle 50 is operated in a normally forward direction). However, when desired to meet the design criteria of a particular application, the cutting apparatus 100 may be implemented on the rear end of the hull structure 60 (not shown).

As such, one example implementation of the present invention may include a cutting apparatus 100 at the front end of the vehicle 50, another example implementation of the present invention may include a cutting apparatus 100 at the rear end of the vehicle 50, and yet another example implementation of the present invention may include cutting apparatuses 100 at both the front end and the rear end of the vehicle 50. Further, multiple instances (not shown) of the cutter assembly 100 may be implemented at either or both ends of the vehicle 50 to meet the design criteria of a particular application. Yet further, one or more of the cutting apparatus 100 may be implemented on the upper surface of the hull 60 such that debris above ground level may be cut and displaced.

Figure 2A:
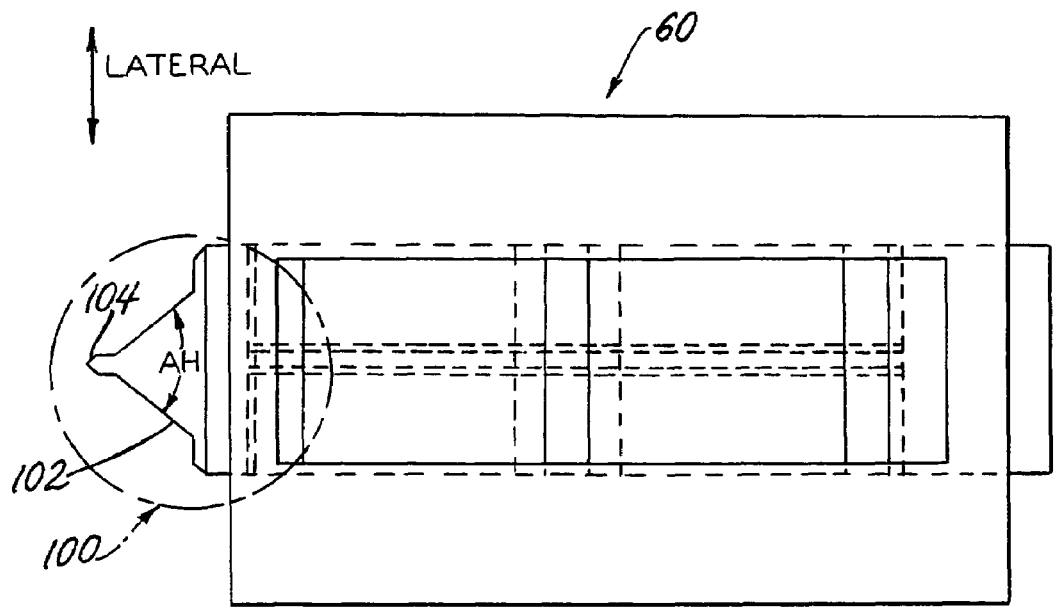
FIGS. 2(A-C) are diagrams illustrating top, side and end views of a vehicle hull implementing an example of the present invention.
Figure 2B:
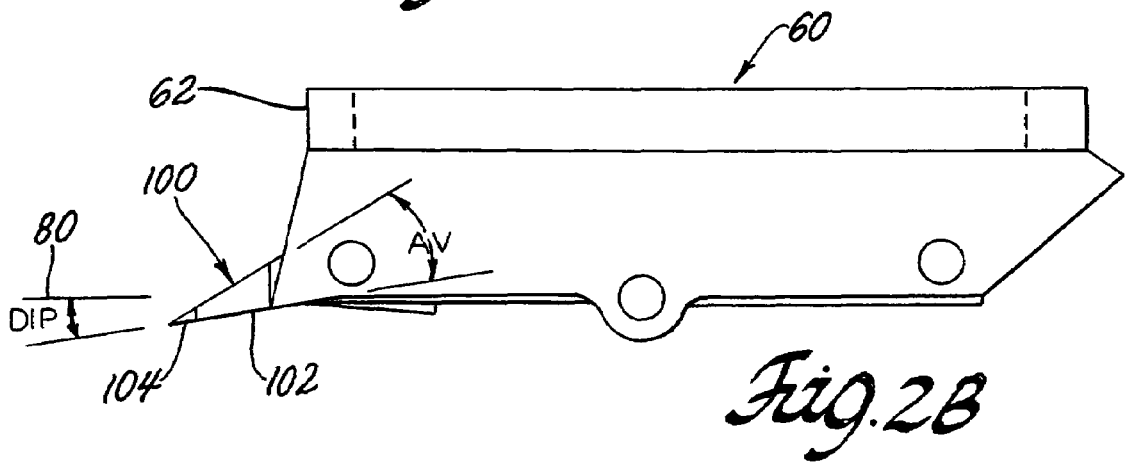
Figure 2C:
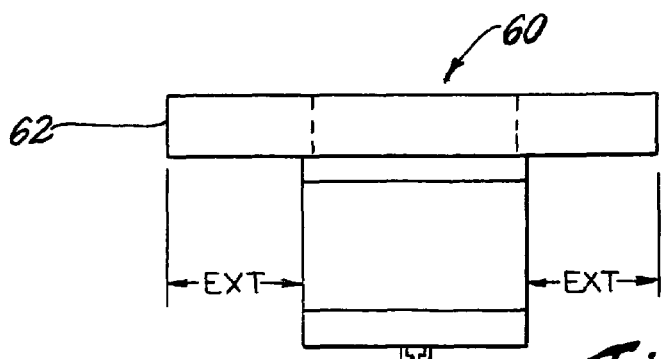

Referring to FIGS. 2(A-C), diagrams illustrating top, side, and rear end views, respectively, of the hull structure 60 are shown in more detail. Details of the vehicle 50 drive/steer mechanism are omitted for clarity. Likewise, some details of the cutting apparatus 100 are omitted for clarity. In one example, the upper portion of the hull 60 may have a deck 62 that may extend past the lower portion of the hull 60 by an amount, EXT. The extension of the deck 62, EXT, may be substantially laterally equal on the left and right sides of the hull 60. Implementation of the extension, EXT, on the lateral sides of the hull 60 may provide a vehicle shape that pushes down debris and thus traverses through debris more readily than a conventional vehicle. The implementation of the extension, EXT, may also urge debris into the cutter apparatus 100 such that the debris is chopped, cut, shredded, and like and, thus, the path through which the vehicle 50 is moving may be cleared more completely than by mere pushing debris aside as is provided by some conventional approaches which lack the overhanging extension EXT.

As illustrated in FIGS. 2A and 2B, the cutter 100 comprises a "nose" shaped (e.g., horizontally oriented pyramid shaped) projection 102 having a narrow (pointed) end that extends in the forward direction from the forward end of bottom side of the structure 60. The cutter 100 may further comprise a substantially triangular shaped or "arrowhead" shaped tip 104 at the apex of the projection 102. The tip 104, in connection with the nose 102, may intersect, spread, and position the debris to be displaced or cut via the cutter system 100 as the vehicle 50 moves forward. The nose shaped structure 102 may be shaped having a horizontal (or lateral) angle, AH, and a vertical angle, AV. Line 80 is a horizontal reference. The nose 102 is generally oriented at an angle, DIP, below the horizontal.

The lateral angle, AH, is generally positioned symmetrically about the central longitudinal axis of the hull 60. However, the lateral angle of the nose 102 may be oriented at any appropriate angle to meet the design criteria of a particular application. The lateral angle, AH, may have a nominal value of 90 degrees, and may have a preferred range of 30 to 120 degrees. The vertical angle, AV, may have a nominal value of 20 degrees, and may have a preferred range of 10 to 45 degrees. The nose angle, DIP, may have a nominal value of 15 degrees below horizontal, and may have a preferred range of 0 to 30 degrees below horizontal.

The pyramid shaped projection 102 in connection with the pointed tip 104, oriented downward at the angle, DIP, may lift debris for cutting via blades on the apparatus 100 rather than bending down the debris thus destroying the debris via the cutting operation.

Figure 3A:
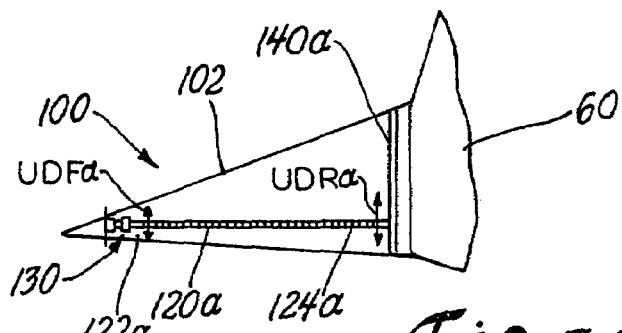
FIGS. 3(A-B) are more detailed diagrams of an example implementation of the present invention.
Figure 3B:
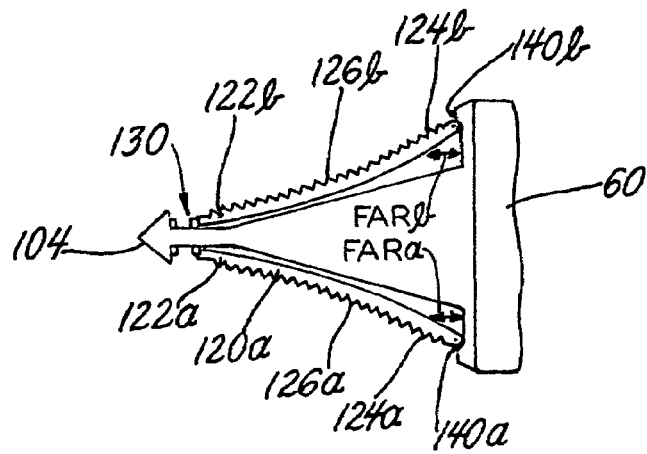

Referring to FIGS. 3(A-B), diagrams illustrating more detailed side and top views, respectively, of the cutter assembly 100 are shown. In particular, FIG. 3A is a left side view of the cutter assembly 100, and FIG. 3B is a top view of the cutter system 100. Left and right sides are generally labeled with subscripts a and b, respectively. While both left and right side views are generally not shown, one of ordinary skill in the art would understand the generally symmetric relationship of the respective elements of the present invention.

The cutter system 100 generally comprises a pair of blades 120 (e.g., blades 120a and 120b) each having a respective blade front 122 (e.g., blade fronts 122a and 122b), blade rear 124 (e.g., blade rears 124a and 124b) and teeth 126 (e.g., teeth 126a and 126b), a front blade mount subsystem 130, and a pair of rear blade mount subsystems 140 (e.g., rear blade mount subsystems 140a and 140b). The blades 120 are generally oriented in the system 100 with a flat plane in the horizontal plane, and cutting edge containing the teeth 126 pointed outward at about the lateral angle, AH.

The present invention generally provides vertical (i.e., up and down) movement, UDF (e.g., left side and right side, UDFa, and UDFb (not shown), respectively), at the front of the blades 120 via the front blade mount subsystem 130 (described in more detail in connection with FIGS. 4-8). The present invention generally further provides vertical (i.e., up and down) movement, UDR (e.g., left side and right side, UDRa, and UDRb (not shown), respectively) and longitudinal (i.e., fore/aft) movement, FAR (e.g., left side and right side, FARa and FARb, respectively), at the rear of the blades 120 via the rear blade mount subsystems 140 (described in more detail in connection with FIGS. 12-19).

Although arcuate (as described in connection with FIGS. 8-10), the motion UDF is generally limited by the blade 120 to a substantially up and down motion. The motion UDR in combination with the motion FAR may be an arcuate motion. As such, the partially constrained/partially free motion of the blades 120 may provide enhanced cutting performance when compared to conventional approaches via the motion of the blades 120 as UDF, UDR, and FAR when an obstruction is encountered as the vehicle 50 proceeds in the forward direction. Further, the partially constrained/partially free motion of the blades 120 may provide reduced damage to the blades 120 when an obstruction is encountered as compared to conventional approaches.

The front movement (UDF) and rear movement (UDR and FAR) of the blades 120 provided by the present invention generally cooperate to provide at least one of (i) more effective blade protection from deformation, damage or breakage, (ii) more effective cutting operation, and (iii) more efficient displacement of debris whether cut or uncut, when compared to conventional approaches.

Figure 6:
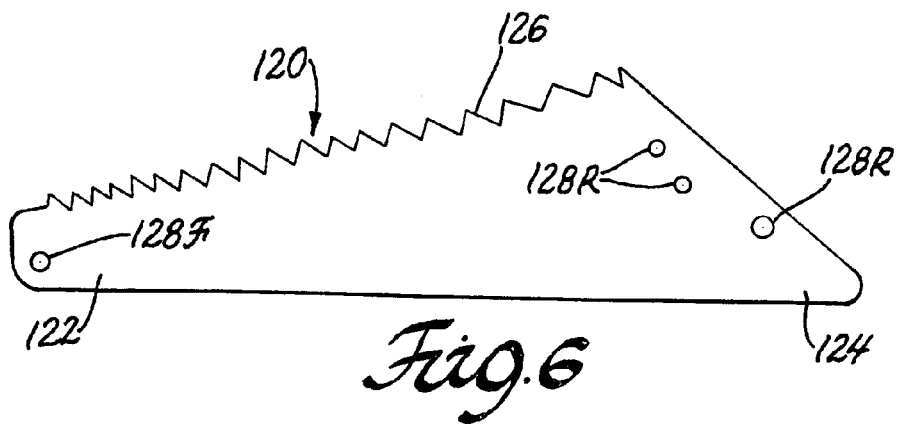
FIGS. 6 and 7 are diagrams of top views of two example blades of the present invention.

In one example, the blades 120 may be implemented having a substantially straight cutting edge (see, for example FIG. 6). In another example, the blades 120 may be implemented having a curved cutting edge (see, for example, FIG. 7). In yet another example, the blades 120 may be implemented having a compound surface (i.e., a combination of straight and curved) cutting edge (not shown).

Figure 4:
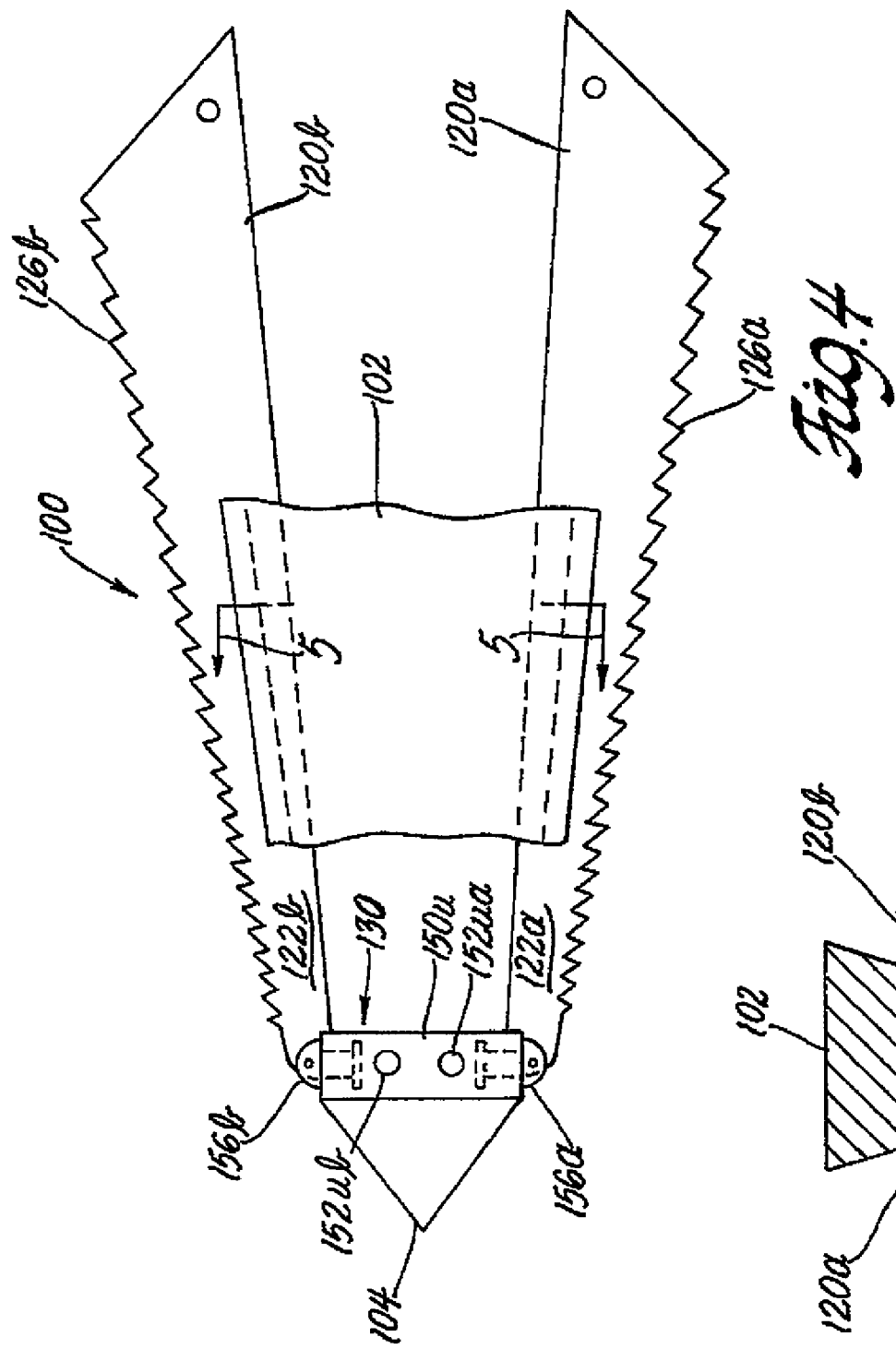
FIG. 4 is a diagram of a top view of an example of the cutting system of the present invention.

Referring to FIG. 4, a diagram illustrating a partial top view of one example of the apparatus 100 is shown. A section line 5-5 is taken through the nose-shaped projection 102 and is illustrated as FIG. 5. A portion of the front of the nose-shaped projection 102 is not illustrated such that portions of the front blade mount subsystem 130 may be shown.

In one example, the front blade mount subsystem 130 generally comprises an upper front slide 150U, a lower front slide 150L (shown, for example, in FIGS. 8(A-B) and 9), a left front blade support 156a, and a right front blade support 156b. The left front blade support 156a generally supports and holds the front end 122a of the left cutting blade 120a. The right front blade support 156b generally supports and holds the front end 122b of the right cutting blade 120b. The upper front slide 150U may have a left slide bolt hole 152Ua and a right slide bolt hole 152Ub. The lower front slide 150L may have a left slide bolt hole 152La and a right slide bolt hole 152Lb (see, FIG. 10).

Figure 5:
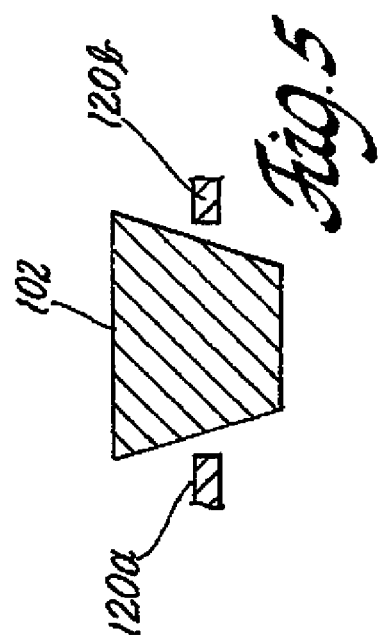
FIG. 5 is a diagram of a cross section of a projection portion of the present invention.

Referring to FIG. 5, a cross-section view of the projection 102 taken at the line 5-5 in FIG. 4 is shown. The nose-shaped extension 102 may have an inverted trapezoidal shape (i.e., the more narrow side of the trapezoid may be on the lower edge of the extension 102).

Referring to FIG. 6, a top view of one example of a straight blade version of a blade 120 is shown. The blade 120 may have at least one front blade retention hole 128F, and at least one rear retention hole 128R.

Figure 7:
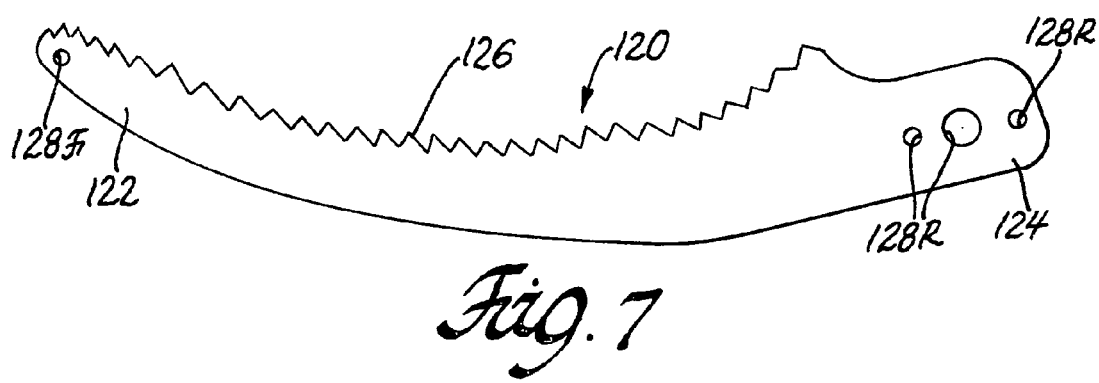

Referring to FIG. 7, a top view of one example of a curved blade version of a blade 120 is shown.

Figure 9:
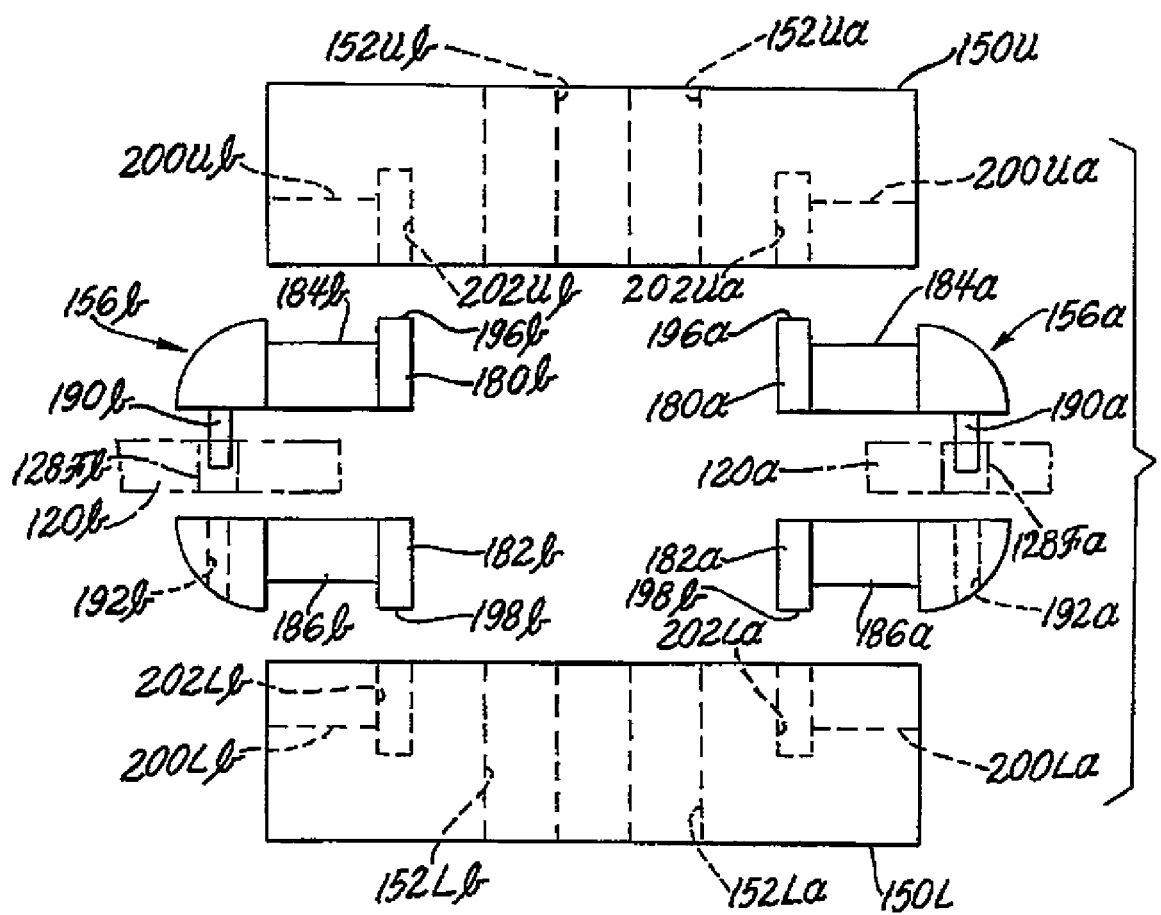
FIG. 9 is a diagram of an exploded, end view of portions of the front mounting subsystem of the present invention.
Figure 10:
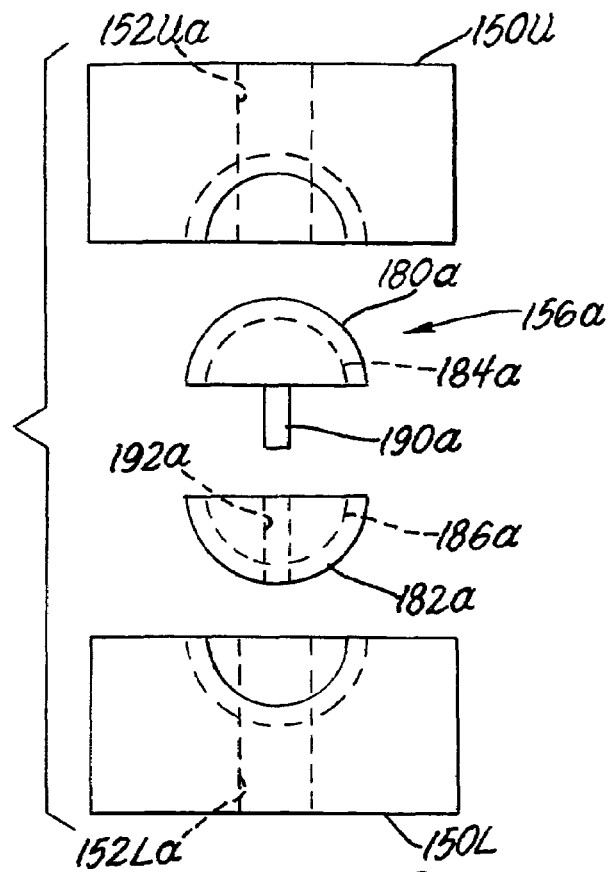
FIG. 10 is a diagram of an exploded, side view of portions of the front mounting subsystem of the present invention.

Referring to FIGS. 8(A-B)-10 concurrently, in particular FIGS. 8(A-B) provide a side view of the forward end of the cutting apparatus 100 showing additional detail of examples of the front blade mount subsystem 130. FIG. 9 is a diagram illustrating an exploded view from the front of a portion of the front blade mount subsystem 130. FIG. 10 is a diagram of an exploded side view illustrating more detail of the upper front slide 150U, the lower front slide 150L, and the left front blade support 156a.

Figure 8A:
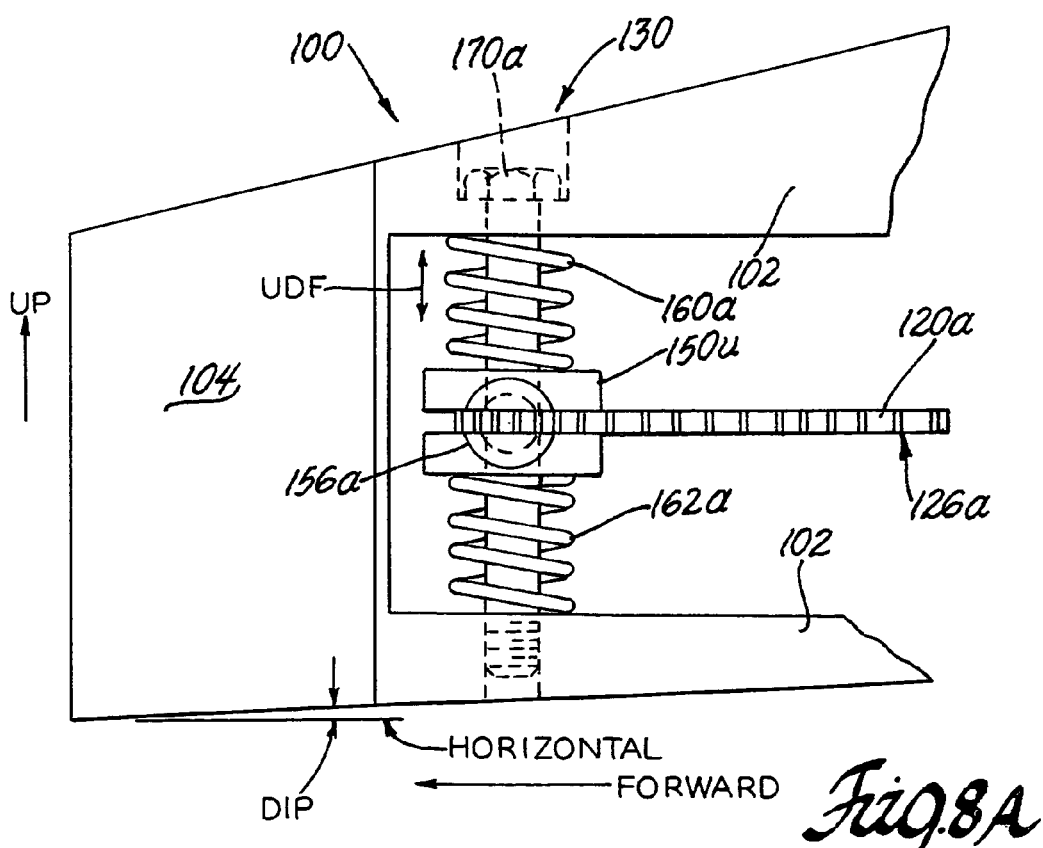
FIGS. 8(A-B) are diagrams of a side view of examples of a front mounting subsystem of the present invention.
Figure 8B:
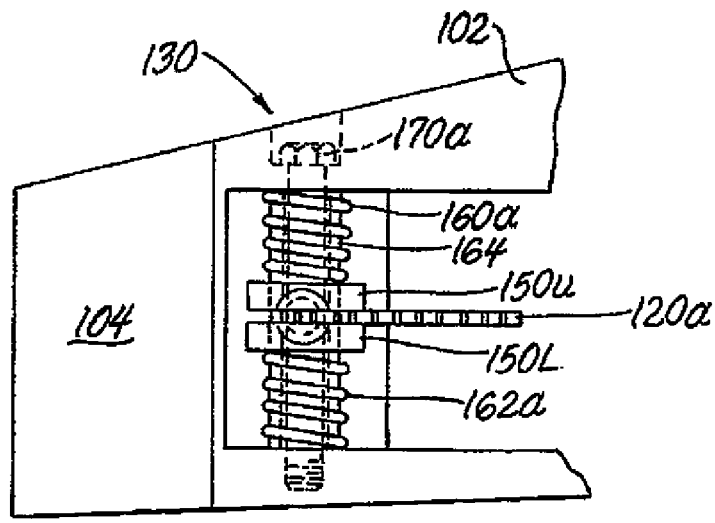

As illustrated in FIG. 8A, the front blade mount subsystem 130 generally further comprises an upper left front spring 160a, a lower left front spring 162a, and a left front slide bolt 170a. Not shown, are right side symmetric elements, i.e., an upper left front spring 160b, a lower left front spring 162b, and a left front slide bolt 170b. The springs 160 and 162 are generally implemented as coil springs having a center opening that is sized to snugly receive the slide bolt 170.

The front blade support 156 is generally cylindrically shaped to provide limited rotation about a lateral axis. That is, the front blade support 156 may perform as an axle in a lateral direction. Rotation of the front blade support 156 is generally limited by the blade 120.

The slide bolts 170 may mechanically couple elements of the front blade mount subsystem 130 (e.g., the upper front spring 160, the upper front slide 150U, the front blade support 156, the blade front 122, the lower front slide 150L, and the lower front spring 162). The springs 160 and 162, in connection with the front blade support 156, may provide compressive forces to mechanically limit the movement of elements of the front blade mount subsystem 130 (e.g., the upper front slide 150U, the front blade support 156, the blade front 122, and the lower front slide 150L) to provide partial up and down motion and lateral axis rotational motion to the front end 122 of the blade 120.

The bolt 170 is generally received in a recess in an upper portion of the nose shaped projection 102, extends centrally through the spring 160, through the upper slide bolt hole 152U, through the lower slide bolt hole 152L, centrally through the spring 162, and is threadably fastened in a lower portion of the nose shaped projection 102. In another example (see, FIG. 8B), bushings (or sleeves) 164 may also be installed centrally in the springs 160 and 162 and through the holes 152 to hold and position the bolts 170, and to reduce friction and wear as the springs 160 and 162 compress and extend.

With reference to FIGS. 9 and 10, the front blade support 156 is generally cylindrically shaped, and generally comprises an upper portion 180 (e.g., upper portions 180a and 180b) and a matching lower portion 182 (e.g., lower portions 182a and 182b). The blade front 122 (shown in phantom in FIG. 9) is generally clamped in the front blade support 156 between the respective upper portion 180 and lower portion 182.

The upper portion 180 generally comprises a substantially semi-cylindrical shaft region 184, a stud portion 190 that extends radially at one end of the upper portion 180, and a substantially semi-cylindrical flange end 196 at the end of the shaft region 184 opposite the stud portion 190. The lower portion 182 generally comprises a substantially semi-cylindrical shaft region 186, a radial hole 192 that mates with the stud portion 190, and a substantially semi-cylindrical flange end 198 at the end of the shaft region 186 opposite the hole 192. The stud 190 generally protrudes through a respective hole 128F and into the mating hole 192 to removably fasten (e.g., restrain, hold, etc.) the blade 120.

The upper/lower front slide 150U/L may include a substantially semi-cylindrical shaft recess 200U/L that generally receives the respective shaft regions 184 (upper) and 186 (lower), and a substantially semi-cylindrical flange recess 202U/L that may receive the respective flange ends 196 (upper) and 198 (lower). The substantially cylindrical front blade support 156 may rotate in the recesses 200 and 202 to provide the substantially vertical (up/down) motion UDF to the blade 120. The flange ends 196 and 198 generally laterally restrain the front blade support 156 in the front slide 150.

Figure 11:
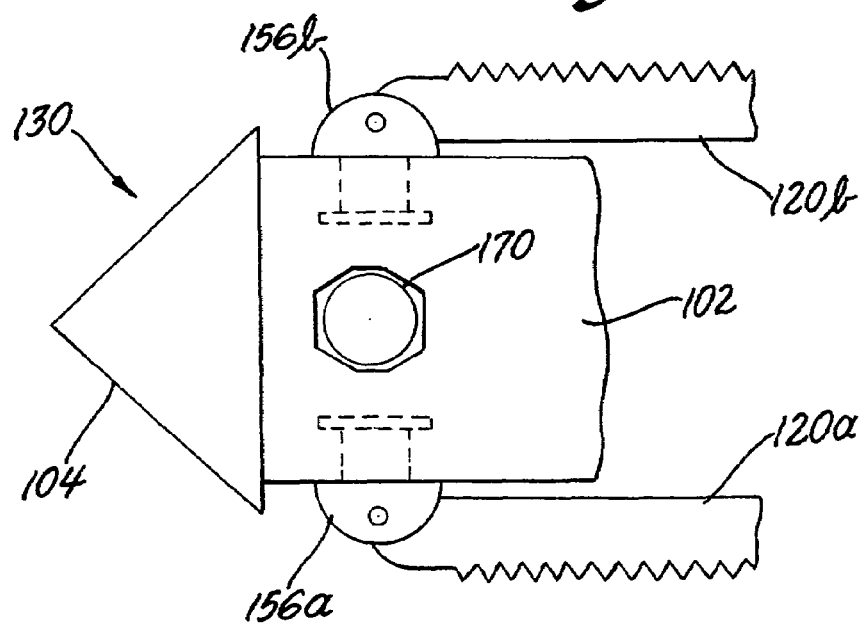
FIG. 11 is a diagram of a top view of an alternative example of a front mounting subsystem of the present invention.

Referring to FIG. 11, a diagram illustrating a simplified, partial top view of another example of the apparatus 100 is shown. The front blade mount subsystem 130 may be implemented having a single slide bolt 170. The single slide bolt 170 may be positioned (i.e., disposed, located, etc.) substantially centrally between left and right front blade supports 156a and 156b. As such (though not shown), a single spring 160 and a single spring 162 are generally implemented when a single slide bolt 170 is implemented.

Figure 12:
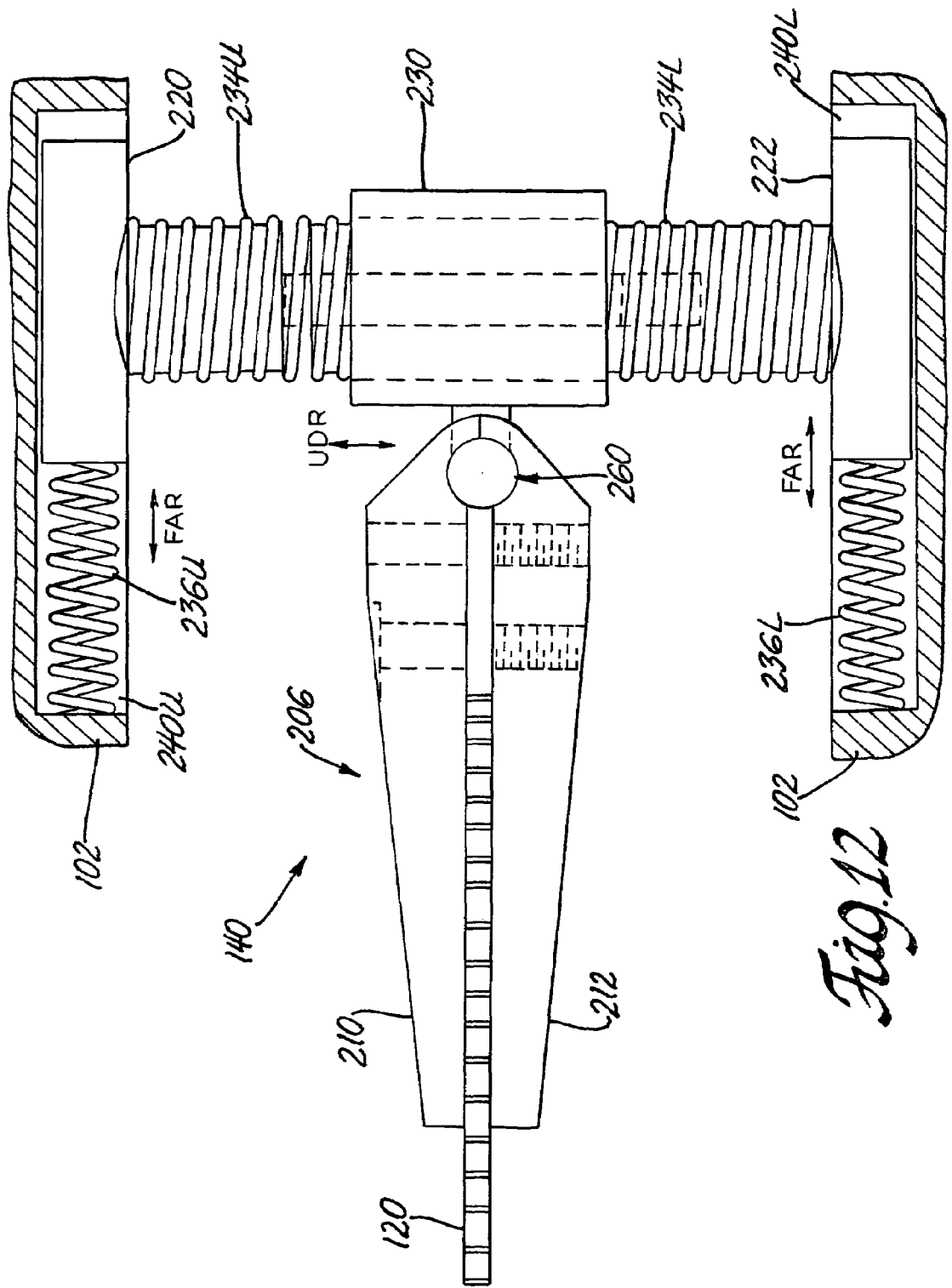
FIG. 12 is a diagram of a side view of a rear mounting subsystem of the present invention.

Referring collectively to FIGS. 12-19, diagrams illustrating components of the rear blade mount subsystem 140 are shown. Referring particularly to FIG. 12, a diagram illustrating a simplified, partial side view of an example of the rear blade mount subsystem 140 is shown. Sectional views of a portion of the pyramid shaped projection 102 are included.

Figure 13:
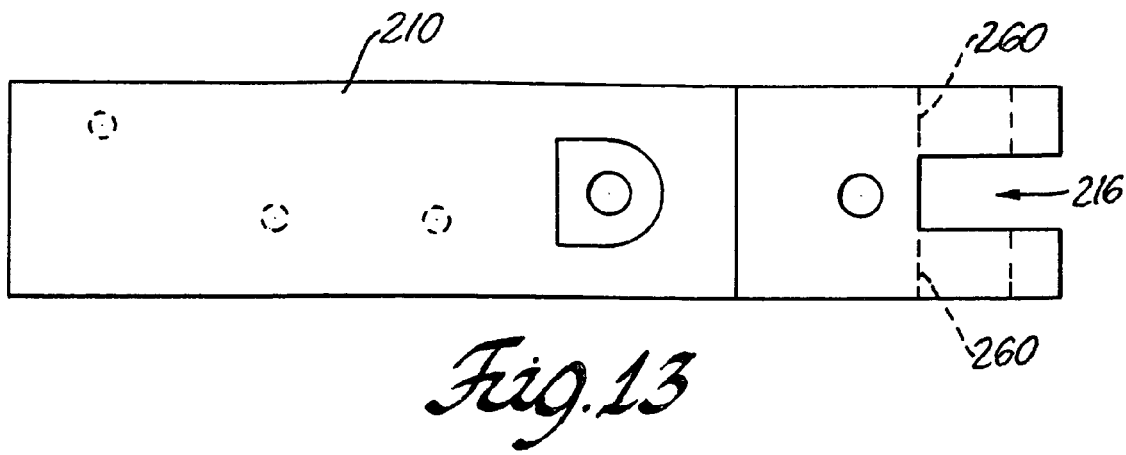
FIG. 13 is a diagram of a top view of a rear blade clamp apparatus of the rear mounting subsystem of the present invention.
Figure 14:
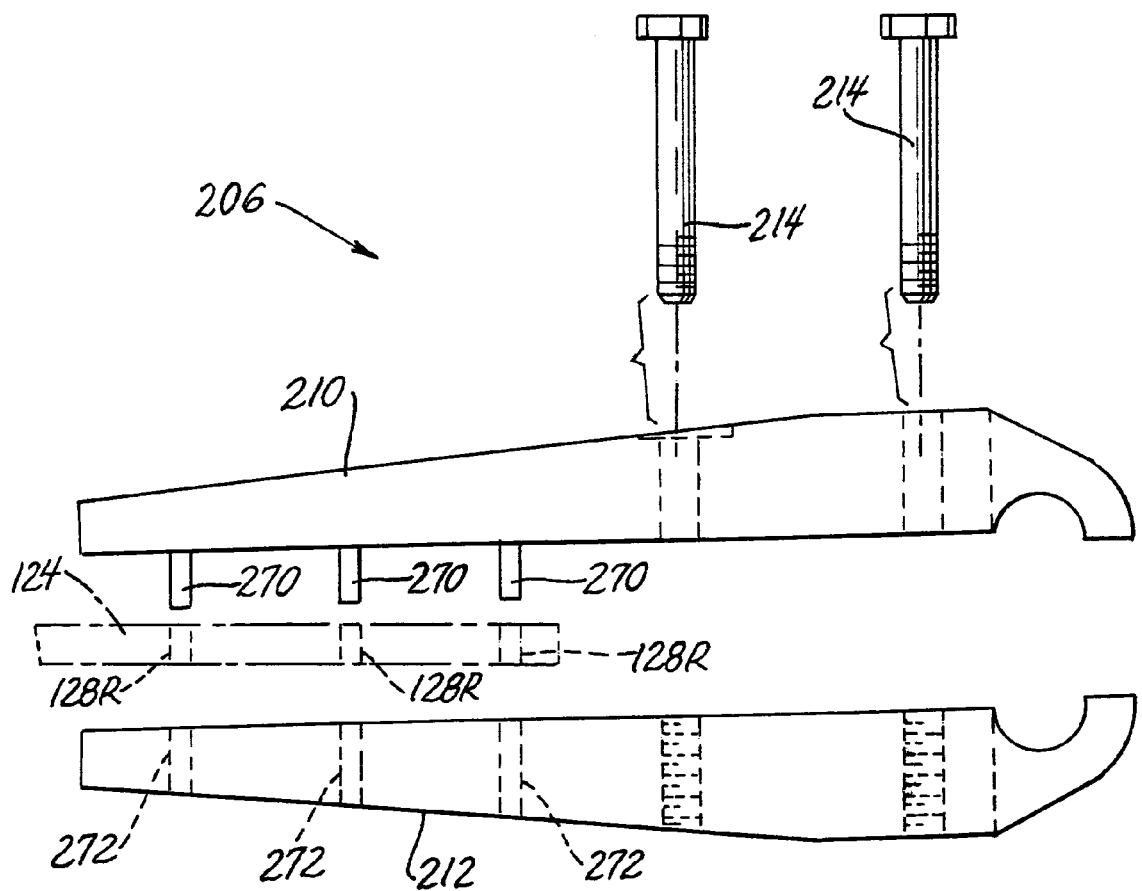
FIG. 14 is a diagram of an exploded, side view of a rear blade clamp apparatus of the rear mounting subsystem of the present invention.
Figure 15:
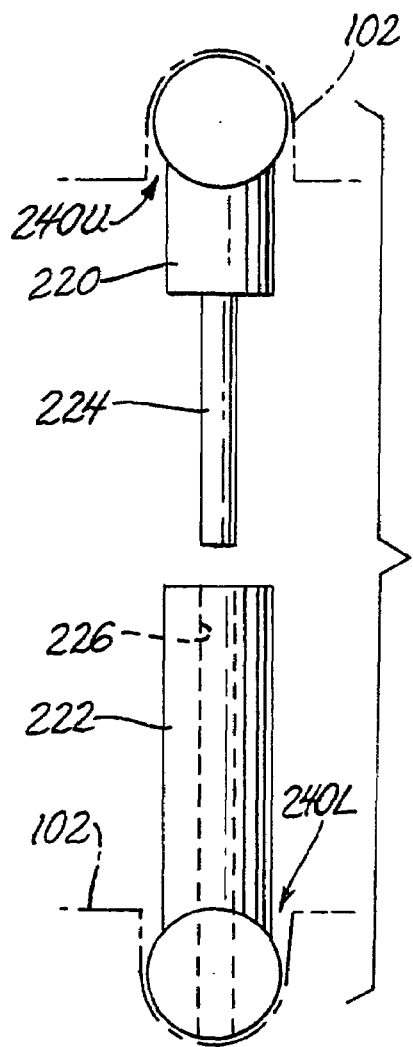
FIG. 15 is a diagram of an exploded, end view of a rear blade tensioner apparatus of the rear mounting subsystem of the present invention.
Figure 16:
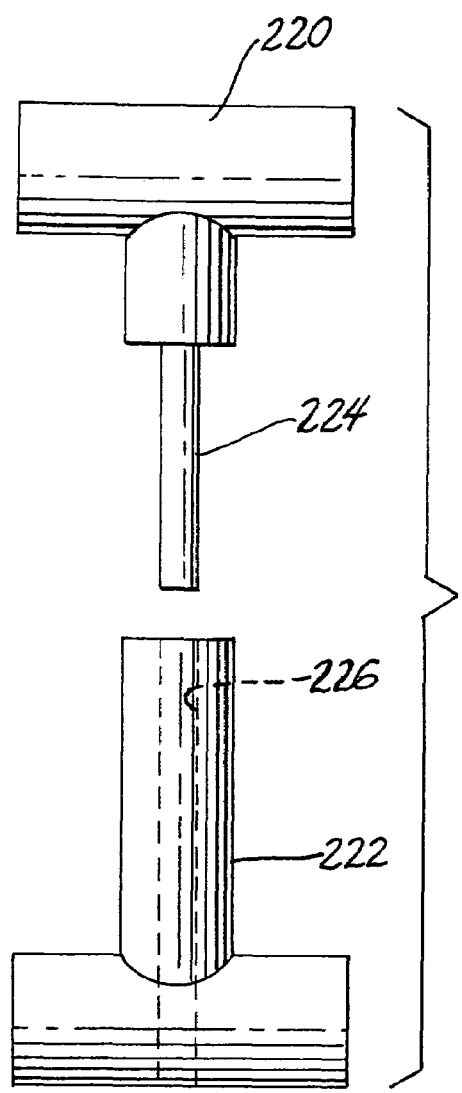
FIG. 16 is a diagram an exploded, side view of a rear blade tensioner apparatus of the rear mounting subsystem of the present invention.
Figure 17:
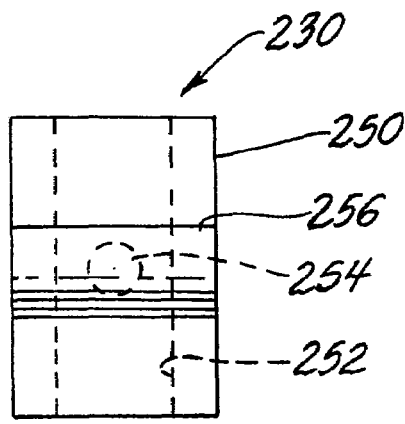
FIGS. 17-19 are diagrams of end, side, and top views, respectively, of a slide of the rear mounting subsystem of the present invention.
Figure 18:
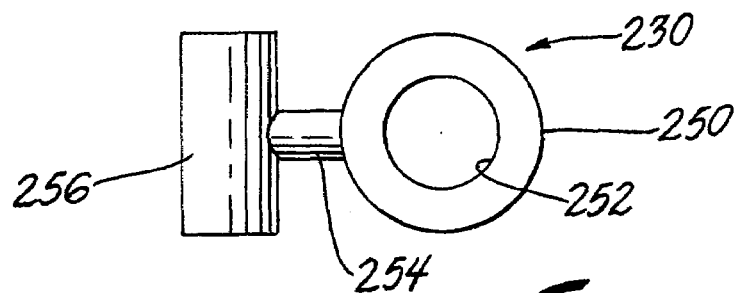
Figure 19:
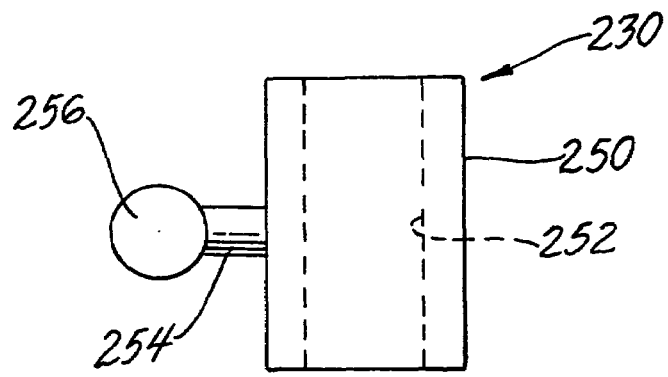

FIGS. 13 and 14 are diagrams of a top view and an exploded side view, respectively, of a blade clamp apparatus of the present invention. FIGS. 15 and 16 are diagrams illustrating end and side views, respectively, of upper and lower tensioner apparatuses of the present invention, in an unassembled (i.e., exploded or not yet slidably coupled as in normal operation) state. In FIG. 15, respective portions of the projection 102 are shown in phantom. FIGS. 17-19 are diagrams of an end view, a top view, and a side view, respectively, of a slide apparatus of the present invention.

The rear blade mount subsystem 140 generally comprises a blade clamp apparatus 206 formed by (i.e., that comprises) an upper rear blade clamp 210 that is generally threadably mechanically coupled (or fastened) to a lower rear blade clamp 212 via bolts 214 (shown in FIG. 14), an upper tensioner 220 that is generally slidably mechanically coupled to a lower tensioner 222 via a shaft extension 224 on the upper tensioner 220 that snugly fits into a mating cylindrical through bore 226 in the lower tensioner 222, a slide 230, vertical rear tension springs 234 (e.g., spring 234U and spring 234L), and longitudinal rear tension springs 236 (e.g., spring 236U and spring 236L).

The upper tensioner 220 and the lower tensioner 222 may be T shaped with substantially similarly sized cylindrical vertical legs and cross-bars. The lower tensioner 222 is generally an inverted T shape. The upper tensioner 220 and the lower tensioner 222 may be laterally and vertically restrained, and slide in the fore/aft (longitudinal) direction in respective mating grooves 240 (e.g., grooves 240U and 240L) in the structure 102 via tension exerted by the vertical rear tension springs 234 and longitudinal rear tension springs 236 as the movements FAR and UDR. The horizontal cross-bars of the upper tensioner 220 and the lower tensioner 222 and the matching grooves 240 are shown as having a circular cross-section, however, any appropriate shape may be implemented.

The vertical rear tension springs 234 are generally sized to snugly slide over respective vertical leg members of the upper tensioner 220 and the lower tensioner 222. The longitudinal rear tension springs 236 are generally mechanically fastened at a front end to the front end of the respective groove 240 and at a rear end to the front end of a respective cross-bar portion of the T shape of the upper tensioner 220 and the lower tensioner 222 via any appropriate technology, as would be understood by one of ordinary skill in the art. The rear blade mount subsystem 140 is generally installed in the projection 102 by compressing the springs 234 and 236, installing the upper tensioner 220 and the lower tensioner 222 in the respective grooves 240U and 240L, and releasing the springs 234 and 236.

The slide 230 may have a substantially cylindrical body section 250 that has a center through bore 252 sized to receive the vertical leg of the lower tensioner 222 and freely slide vertically thereon as the movement UDR. The slide 230 may further comprise a connector leg 254 and an axle (e.g., cylindrical leg) 256. The body section 250 is generally implemented as a vertically oriented pipe or tube shaped portion of the slide 230. The connector (or coupling) leg 254 is generally horizontally and longitudinally oriented and mechanically couples the body section 250 to the axle 256. The axle 256 is generally horizontally and laterally oriented.

FIGS. 13 and 14 are a top view and an exploded side view, respectively, of the blade clamp apparatus 206. As illustrated in FIG. 14, the respective rear blade portion 124 (shown in phantom) may be clamped between the upper rear blade clamp 210 and the lower rear blade clamp 212. When the upper rear blade clamp 210 and the lower rear blade clamp 212 are fastened together via the bolts 214, a substantially cylindrical, laterally oriented receiving bore 260 is formed. The bore 260 is generally sized to receive the cylindrical leg (axle) 256 to provide rotational movement at the joint formed by the leg 256 in the bore 260 as the slide 230 moves longitudinally and vertically through the motions FAR and UDR. A gap 216 in the blade clamp apparatus 206 may provide a clearance path for the coupling leg 254.

The upper rear blade clamp 210 generally includes a plurality of pegs 270 that extend downward from the underside of the clamp 210. The lower rear blade clamp 212 generally includes a matching plurality of vertical holes 272 that are sized and positioned to mate with the respective pegs 270. When the upper rear blade clamp 210 and the lower rear blade clamp 212 are fastened together, the pegs (or shafts) 270 extend through respective holes 128R in the blade 120 to removably fasten the blade rear 124 within the cutting apparatus 100.

As illustrated in FIGS. 15 and 16, the upper tensioner 220 generally includes the shaft portion 224 that extends vertically downward and slidingly mechanically mates in the hole (or through bore) 226 in the vertical leg of the lower tensioner 222 to provide the movement UDR. The shaft 224 and mating hole 226 may, in cross-section, be cylindrical, square, hexagonal, or any other appropriate shape to meet the design criteria of a particular application.

The springs 160, 162, 234, and 236 generally have a spring constant that is selected (i.e., predetermined, chosen, calculated, etc.) to provide retention of the blade 120 within the system 100 while providing the movement UDF, UDR, and FAR such that cutting motion of the blade 120 is enhanced and damage to the blade 120 is reduced or prevented during normal operation.

The cutting apparatus 100 of the present invention may be advantageously augmented by further implementing an additional cutting apparatus (or apparatuses) across the front and top of the vehicle 50. Such an additional cutting apparatuses may, in one example, be implemented as a vehicle wire cutter as shown and described in U.S. Pat. No. 5,586,785 to Warner, et al., which is incorporated by reference herein in its entirety. However, such an additional cutting apparatus may be implemented as any appropriate device to meet the design criteria of a particular application.

While illustrated and described as a single device, the cutting system 100 may be implemented as a plurality of cutters 100 as shown and described herein when desired to meet the design criteria of a particular application.

As is apparent then from the above detailed description, the present invention may provide an improved system for a cutting apparatus that may be mounted to a vehicle.

Various alterations and modifications will become apparent to those skilled in the art without departing from the scope and spirit of this invention and it is understood this invention is limited only by the following claims.

What is claimed is:

1. A debris cutting system for attachment to a vehicle, the system comprising:
  a nose shaped projection that extends horizontally in the forward direction from the forward moving end of the vehicle, the projection comprising a front blade mount subsystem, a left rear blade mount subsystem, and a right rear blade mount subsystem; and
  a left blade and a right blade that are mounted within the front blade mount subsystem and within the respective left and right rear blade mount subsystems, wherein
    each blade has a respective blade front, blade rear and teeth, and the front blade mount subsystem provides vertical movement at the front of the blades, the rear blade mount subsystems provide vertical and longitudinal movement at the rear of the blades such that cutting of debris is enhanced and damage to the blades is reduced as the vehicle moves forward, and
    the front blade mount subsystem comprises:
    an upper front slide;
    a lower front slide;
    a left front blade support; and
    a right front blade support, wherein
      the left front blade support and the right front blade support are mounted between the upper and lower front slides, the left front blade support supports and holds the left blade front, the right front blade support supports and holds the right blade front, and the left and right front blade supports are cylindrically shaped to provide rotation about a lateral axis and the rotation is limited by the respective blades such that the vertical movement at the front of the blades is provided.

2. The system of claim 1, wherein the front blade mount subsystem further comprises:
  upper left and right front springs, lower left and right front springs, and left and right front slide bolts; and
  the upper front slide comprises an upper left slide bolt hole and an upper right slide bolt hole;
  the lower front slide comprises a lower left slide bolt hole and a lower right slide bolt hole, wherein
    the respective front slide bolts are received in respective recesses in an upper portion of the nose shaped projection, extend centrally through the respective upper front springs, through the respective upper slide bolt holes, through the respective lower slide bolt holes, centrally through the respective lower front springs, and are threadably fastened in a lower portion of the nose shaped projection such that the respective upper and lower front springs provide compressive force to retain the respective blade fronts.

3. The system of claim 2, wherein each of the cylindrically shaped front blade supports comprises an upper portion and a matching lower portion; and
  the upper portion comprises a substantially semi-cylindrical upper shaft region, a stud portion that extends radially at one end of the upper portion, and a substantially semi-cylindrical upper flange end at the end of the shaft region opposite the stud portion, and the lower portion comprises a substantially semi-cylindrical lower shaft region, a radial hole that mates with the stud portion, and a substantially semi-cylindrical lower flange end at the end of the lower shaft region opposite the radial hole, and the stud protrudes through a respective front blade mounting hole and into the radial hole to removably clamp the blade front in the front blade support between the respective upper portion and lower portion, wherein
  the upper and lower front slides comprise respective substantially semi-cylindrical upper and lower shaft recesses that receive the respective upper and lower shaft regions, and respective substantially semi-cylindrical upper and lower flange recesses that receive the respective upper and lower flange ends, and the respective cylindrically shaped upper and lower front blade supports rotate in the upper and lower recesses, and the respective upper and lower flange ends laterally restrain the front blade supports in the front slides.

4. The system of claim 1, wherein the left and right rear blade mount subsystems each comprise:
  a blade clamp apparatus that comprises an upper rear blade clamp that is threadably mechanically coupled to a lower rear blade clamp via bolts, wherein the respective blade rear is clamped between the upper rear blade clamp and the lower rear blade clamp;
  an upper tensioner;
  a lower tensioner that is slidably mechanically coupled to the upper tensioner via a shaft extension on the upper tensioner that snugly fits into a mating cylindrical through bore in the lower tensioner;
  a rear slide;
  vertical rear tension springs; and
  longitudinal rear tension springs, wherein
    the upper tensioner and the lower tensioner are T shaped with substantially similarly sized cylindrical vertical legs and cross-bars, and the lower tensioner is an inverted T shape;
    the upper tensioner and the lower tensioner are laterally and vertically restrained, and slide in the fore/aft direction in respective mating grooves in the projection via tension exerted by the vertical rear tension springs and longitudinal rear tension springs to provide vertical and longitudinal movement at the rear of the blades;
    the vertical rear tension springs are sized to snugly slide over respective vertical leg members of the upper tensioner and the lower tensioner;
    the longitudinal rear tension springs are mechanically fastened at a front end to the front end of the respective groove and at a rear end to the front end of a respective cross-bar portion of the T shape of the upper tensioner and the lower tensioner;

the rear slide comprises a substantially cylindrical body section that has a center through bore sized to receive the vertical leg of the lower tensioner and freely slide vertically thereon;

the rear slide further comprises a connector leg and an axle;

the cylindrical body section is implemented as a vertically oriented pipe;

the connector leg is generally horizontally and longitudinally oriented and mechanically couples the body section to the axle; and the axle is horizontally and laterally oriented.

5. The system of claim 4, wherein the respective upper rear blade clamp and the lower rear blade clamp are fastened together to form a substantially cylindrical laterally oriented receiving bore, the bore is sized to receive the axle to provide vertical and longitudinal movement at the rear of the blades, and a gap in the upper rear blade clamp and the lower rear blade clamp provides a clearance path for the connector leg; and the upper rear blade clamp includes a plurality of pegs that extend downward from the underside of the upper rear blade clamp, the lower rear blade clamp includes a matching plurality of vertical holes that are sized and positioned to mate with the respective pegs, when the upper rear blade clamp and the lower rear blade clamp are fastened together, the pegs extend through respective rear mounting holes in the rear blade to removably fasten the blade rear within the system.

6. The system of claim 1, further comprising a substantially triangular shaped or "arrowhead" shaped tip at the apex of the projection that intersects, spreads and positions debris to be displaced or cut via the system as the vehicle moves forward.

* * * * *